(12) United States Patent
Shyu

(10) Patent No.: US 7,177,017 B2
(45) Date of Patent: Feb. 13, 2007

(54) USB OPTICAL TIME DOMAIN REFLECTOMETER

(75) Inventor: Hsuen Chyun Shyu, Hsinchu (TW)

(73) Assignee: Radiantech, Inc. (TW)

( * ) Notice: Subject to any disclaimer, the term of this patent is extended or adjusted under 35 U.S.C. 154(b) by 0 days.

(21) Appl. No.: 10/845,156

(22) Filed: May 14, 2004

(65) Prior Publication Data

US 2005/0128466 A1 Jun. 16, 2005

(30) Foreign Application Priority Data

Dec. 11, 2003 (TW) .............................. 92221748 U

(51) Int. Cl.
*G01N 21/00* (2006.01)
(52) U.S. Cl. .................................... 356/73.1
(58) Field of Classification Search ............... 356/73.1; 385/24, 37, 12; 250/227.15–227.18
See application file for complete search history.

(56) References Cited

U.S. PATENT DOCUMENTS

| 6,519,026 B1 * | 2/2003 | Holland ..................... 356/73.1 |
| 6,653,844 B2 * | 11/2003 | Wyar ......................... 324/533 |
| 2003/0030787 A1 * | 2/2003 | Beller et al. ............... 356/73.1 |

\* cited by examiner

*Primary Examiner*—Tu T. Nguyen
(74) *Attorney, Agent, or Firm*—Venable, LLP; James R. Burdett; Jeffri A. Kaminski

(57) ABSTRACT

An USB OTDR (Optical Time Domain Reflectometer) is disclosed to include an OTDR (Optical Time Domain Reflectometer) module adapted to test a fiber-optic in a fiber-optic transmission system, and an USB module adapted to connect the OTDR module to an external device to obtain power supply from the external device, for enabling the external device to control the OTDR module to test the linked fiber-optic and to collect feedback data.

7 Claims, 2 Drawing Sheets

USB OPTICAL TIME DOMAIN REFLECTOMETER

BACKGROUND OF THE INVENTION

1. Field of the Invention

The present invention relates to an USB OTDR (Optical Time Domain Reflectometer) adapted to test fiber-optic connection status and more particularly, to such an USB OTDR, which uses USB port to provide power supply and to feed back test result to the computer and can be controlled by the computer to fetch related test data and result.

2. Description of the Related Art

A fiber-optic is a thin piece of fiber glass capable of transmitting light, having a diameter about 100~150 microns, or slightly thicker than the hair. Therefore, a fiber-optic is light in weight and easily bendable. Using these features for communication by means of the application of light is called fiber-optic communication. Nowadays, fiber-optic communication has been practically used in our daily life. In fiber-optic communication, the fiber-optic acts the role that inputs data into a light beam for transmission. Therefore, a fiber-optic has an ingenuous internal structure that is made by a special technique. A fiber-optic is comprised of two parts, namely, the center part called the core, and the outer part called the clad. In order to transmit light ray, these two parts have different refractive indexes, and the refractive index of the core must be slightly greater than the clad. Thus, the major part of light entering the core causes a total reflection at the interface between the core and the clad so as to keep passing forwards, i.e., the light beam passing from the core toward the clad is totally reflected at the interface between the core and the clad and prohibited from passing to the outside of the clad. Even if the fiber-optic is curved, the light beam will be collided with and reflected by the interface between the core and the clad and will simultaneously keep passing forwards along the core of the curved fiber-optic.

Therefore, a fiber-optic has the following advantages:

1. Thin thickness: When one thousand pieces of fiber-optics arranged into a bundle, the width of the bundle of fiber optics is just about 7 cm.

2. High data transmission rate and long transmission distance: The transmission rate of a fiber-optic can be as high as 100 Gbps, and its transmission distance can be as long as 100 km. Functionally, one fiber-optic communication line is about equal to ten thousands of telecommunication lines.

3. Having a light weight and corrosion-proof and electric wave interference preventive characteristics, and being durable in use.

As stated above, a fiber-optic can be installed at a long distance. During installation, fusion splices and connectors are used to extend the distance of the fiber-optic, and there may be bend, fiber end, or other conditions that may cause poor optical communication. Conventional OTDRs are capable of detecting the aforesaid various conditions, and finding out fault-locating of fiber link.

FIG. 1 is a system block diagram of an OTDR according to the prior art. As illustrated, the OTDR comprises a front connector 10, a laser diode 11, a coupler 12, a pulse generator 13, an APD (avalanche photodiode) 14, an amplifier 15, an AD converter 16, control, signal and data processing 17 module, and a display 18.

The fiber-optic under test is connected to the front connector 10. After connection of the fiber-optic under test to the front connector 10, the control, signal and data processing 17 controls the pulse generator 13 to generate a pulse signal, causing the laser diode 11 to generate an optical signal. The optical signal from the laser diode 11 passes through the coupler 12 to the fiber-optic under test. If an abnormal condition occurred in the fiber optic under test, a feedback signal will be produced and monitored. The reflected signal from the fiber-optic under test will be received by the APD 14 via the coupler 12, and then amplified by the amplifier 15, and then converted into a digital signal by the AD converter 16, and then processed by the control, signal and data processing 17 module for output through the display 18.

FIG. 2 is an OTDR test result chart according to the prior art. As indicated in the waveform, the OTDR can search the distances (locations) of different line conditions including front connector 21, fusion splice 22, connector 23, bend 24, poor connector 25, backscatters 26, and fiber end 27. As indicated, the fiber-optic signal is attenuated with the distance, and different conditions produce different signals. Subject to signal attenuation status and signal produced, fault-locating fiber link is monitored, and maintenance or repair work can rapidly be performed subject to the test result.

Therefore, an OTDR is an important tool to offer an in-service fault-locating of fiber link in fiber-optic transmission systems. However, because conventional OTDRs are a combination of hardware and software, they are commonly heavy and bulky, not easy to move.

Further, USB (Universal Serial Bus) devices have been well developed and intensive used in any of a variety of electronic apparatus including mice, scanners, displays, printers, and etc. When using a certain peripheral apparatus, you need only a plug the USB plug of the peripheral apparatus to the USB socket of a computer of the USB hub of a computer network, and the computer will automatically detect the model of the newly installed peripheral apparatus and install the related driver. When not required, the user can disconnect the USB plug of the peripheral apparatus at anytime without affecting the operation of the window system of the computer. Except the aforesaid advantages, transmission speed of an USB device is more than ten times over a conventional parallel device. Further, it is not necessary to provide additional power cords for peripheral apparatus that are connected to an USB hub because the USB connector of every peripheral apparatus can be obtain the necessary working voltage through the USB hub. Therefore, the use of USB devices lessens the problem of the arrangement of power sockets.

Further, various mobile digital products such as notebook computers, PDAs (Personal Data Assistants) and etc. have been well developed and intensively used by people in every country. These products are commonly incorporated with USB connectors or the like. Combining an OTDR with these mobile digital products will greatly improve the convenience of the use of these mobile digital products.

SUMMARY OF THE INVENTION

The present invention has been accomplished under the circumstances in view. It is the main object of the present invention to provide an USB OTDR (Optical Time Domain Reflectometer), which can be connected to a computer to directly obtain power supply from the computer, enabling the computer to control the test.

To achieve this and other objects of the present invention, the USB OTDR comprises an OTDR (Optical Time Domain Reflectometer) module adapted to test a fiber-optic in a fiber-optic transmission system, and an USB module adapted to connect the OTDR module to an external device to obtain power supply from the external device, for enabling the external device to control the OTDR module to test the linked fiber-optic and to collect feedback data.

The OTDR (Optical Time Domain Reflectometer) module is comprised of a laser diode, a coupler, a pulse generator, an APD (avalanche photodiode), an amplifier, an AD converter, and a control and signal processing module.

The OTDR (Optical Time Domain Reflectometer) module can search the distances (locations) of line conditions of the linked fiber-optic including front connector, fusion splice, connector, bend, poor connector, backscatters, and fiber end.

The USB module comprises an USB connector adapted to connect the USB OTDR (Optical Time Domain Reflectometer) to an external computer to obtain power supply from the external computer, for enabling the external computer to control the OTDR (Optical Time Domain Reflectometer) module to search the linked fiber-optic and to let searched data be displayed on the display of the external computer and transmitted to remote devices.

Further, the external computer can be a notebook computer, a personal computer, or an embedded system of a communication/test system that has an USB port for receiving the USB module.

DETAILED DESCRIPTION OF THE PREFERRED EMBODIMENT

Figure 1:
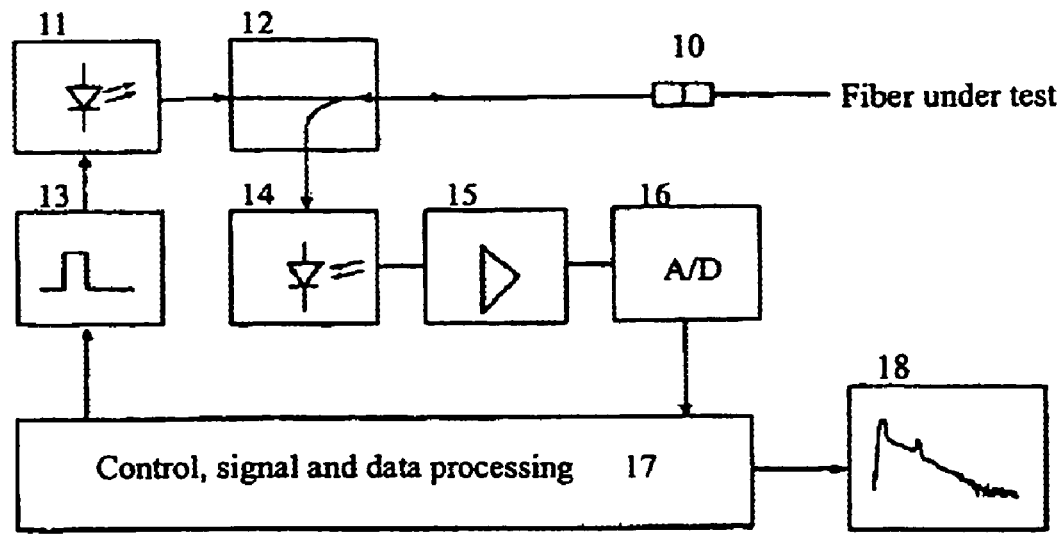
FIG. 1 is a system block diagram of an OTDR according to the prior art.
Figure 2:
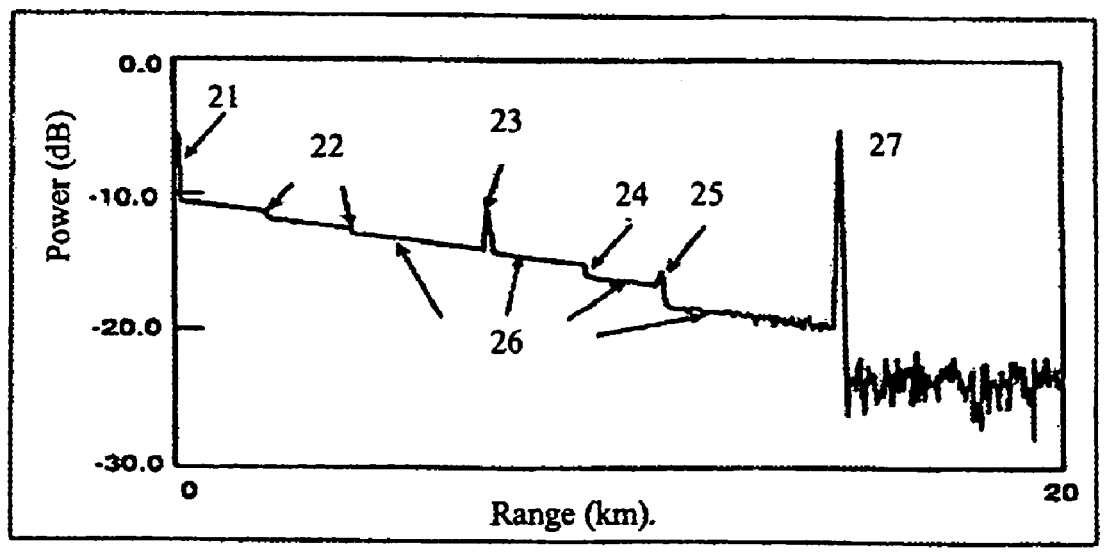
FIG. 2 is an OTDR test result chart according to the prior art.
Figure 3:
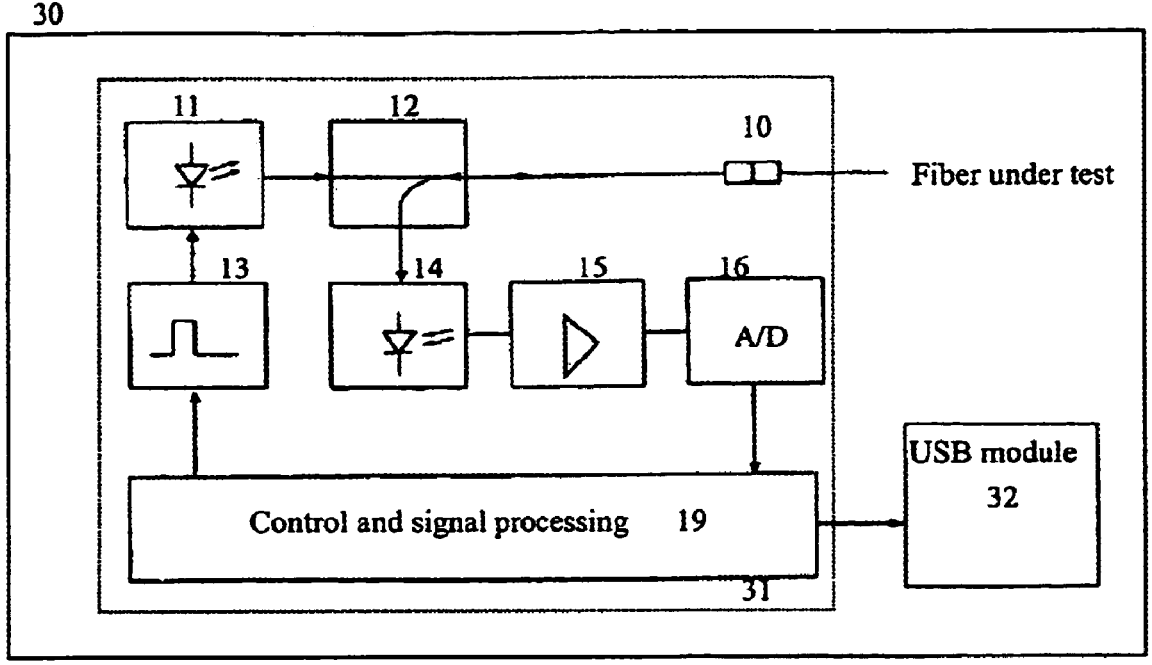
FIG. 3 is a block diagram of an USB OTDR according to the present invention.

Referring to FIG. 3, an USB (Universal Serial Bus) OTDR (Optical Time Domain Reflectometer) 30 is shown comprised of an OTDR module 31 and an USB module 32. The OTDR module 31 is adapted to offer an in-service fault-locating of fiber link in fiber-optic transmission systems. The USB module 32 is adapted to connect an external device (for example, a computer) to the OTDR module 31, for enabling the external device to control the OTDR module 31 to test the linked fiber-optic and to collect feedback data.

The OTDR module 31 is comprised of a laser diode 11, a couple 12, a pulse generator 13, an APD (avalanche photodiode) 14, an amplifier 15, an AD converter 16, and a control and signal processing 19 module. The OTDR module 31 can search the distances (locations) of various line conditions including front connector 21, fusion splice 22, connector 23, bend 24, poor connector 25, backscatters 26, fiber end 27.

Figure 4:
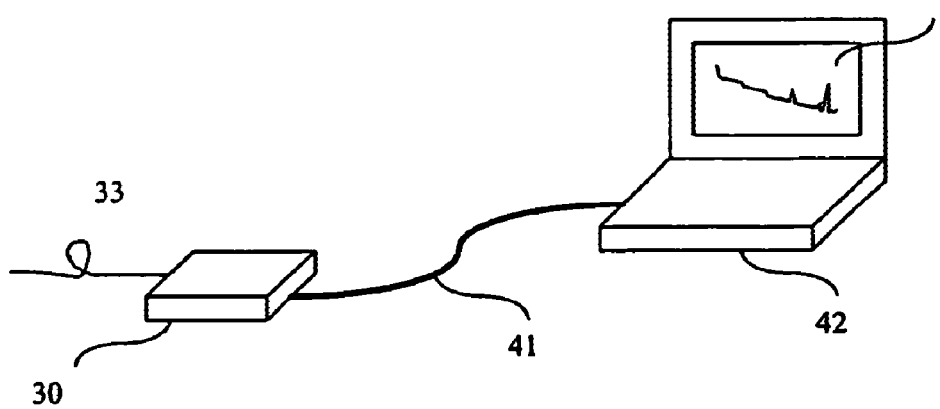
FIG. 4 is a schematic drawing showing the USB OTDR connected to a notebook computer according to the present invention.

FIG. 4 is a schematic drawing showing the USB OTDR connected to a notebook computer according to the present invention. As illustrated, the USB (Universal Serial Bus) OTDR (Optical Time Domain Reflectometer) 30 uses the USB connector of the USB module 32 for connection to a notebook computer 42 through a USB cable 41. When connected to the notebook computer 42, the USB (Universal Serial Bus) OTDR (Optical Time Domain Reflectometer) 30 obtains power supply from the notebook computer 42, and enables the notebook computer 42 to control the OTDR module 31 to monitor the fiber-optic 33. Every condition searched by the OTDR module 31 is displayed on the display screen 43 of the notebook computer 42. Further, the USB (Universal Serial Bus) OTDR (Optical Time Domain Reflectometer) 30 can use the USB module 32 to transmit data to a remote site.

As indicated above, the USB (Universal Serial Bus) OTDR (Optical Time Domain Reflectometer) maintains the hardware and a part of the firmware of a conventional OTDR and is added with an USB module, and has the display and the other part of the firmware shifted to the notebook computer. Therefore, the USB (Universal Serial Bus) OTDR (Optical Time Domain Reflectometer) of the present invention can be controlled by an external computer to monitor the fiber-optic under test and to display the test result on the display screen of the linked external computer. When in use, the test can be immediately performed simply by connecting the USB module to the USB port of a mobile computer. This design greatly reduces the weight for high mobility. Because the invention removes the display, the software, and a part of the firmware, the manufacturing cost of the USB OTDR is greatly reduced.

A prototype of USB OTDR (Optical Time Domain Reflectometer) has been constructed with the features of the annexed drawings of FIGS. 3 and 4. The USB OTDR (Optical Time Domain Reflectometer) functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A USB Optical Time Domain Reflectometer (OTDR) system, comprising:
    a first housing;
    a test module disposed in the first housing, the test module adapted to test a fiber optic in a fiber optic transmission system and to collect feedback data;
    a second housing;
    a control module disposed in the second housing, the control module adapted to send control signals to the test module in order to control operation of the test module; and
    a USB module adapted to connect the test module to the control module and to provide a power supply from the second housing to the test module, the raw data being provided to the control module and the control signals being provided to the test module via the USB module.

2. The USB OTDR (Optical Time Domain Reflectometer) as claimed in claim 1, wherein said OTDR (Optical Time Domain Reflectometer) module is comprised of a laser diode, a coupler, a pulse generator, an APD (avalanche photodiode), an amplifier, an AD converter, and a control and signal processing module.

3. The USB OTDR (Optical Time Domain Reflectometer) as claimed in claim 1, wherein said OTDR (Optical Time Domain Reflectometer) module is adapted to search the distances (locations) of line conditions of the fiber-optic including front connector, fusion splice, connector, bend, poor connector, backscatters, and fiber end.

4. The USB OTDR (Optical Time Domain Reflectometer) as claimed in claim 1, wherein said USB module comprises an USB connector adapted to connect the USB OTDR (Optical Time Domain Reflectometer) to an external computer to obtain power supply from said external computer, for enabling said external computer to control said OTDR (Optical Time Domain Reflectometer) module to search the linked fiber-optical and to let searched data be displayed on a display of said external computer and transmitted to remote devices.

5. The USB OTDR (Optical Time Domain Reflectometer) as claimed in claim 4, wherein said external computer is a notebook computer having an USB port for receiving said USB module.

6. The USB OTDR (Optical Time Domain Reflectometer) as claimed in claim 4, wherein said external computer is a personal computer having an USB port for receiving said USB module.

7. The USB OTDR (Optical Time Domain Reflectometer) as claimed in claim 1, wherein said external computer is an embedded system of a communication system or test system that has an USB port for receiving said USB module.

* * * * *